(12) United States Patent
Go (10) Patent No.: US 9,164,332 B2
(45) Date of Patent: Oct. 20, 2015

(54) DISPLAY DEVICE

(71) Applicant: Jae Kyung Go, Yongin (KR)

(72) Inventor: Jae Kyung Go, Yongin (KR)

(73) Assignee: SAMSUNG DISPLAY CO., LTD., Yongin, Gyunggi-Do (KR)

( * ) Notice: Subject to any disclaimer, the term of this patent is extended or adjusted under 35 U.S.C. 154(b) by 284 days.

(21) Appl. No.: 13/668,785

(22) Filed: Nov. 5, 2012

(65) Prior Publication Data

US 2014/0034953 A1 Feb. 6, 2014

(30) Foreign Application Priority Data

Aug. 2, 2012 (KR) .......................... 10-2012-0084863

(51) Int. Cl.
*H01L 31/00* (2006.01)
*G02F 1/1343* (2006.01)
*G02F 1/1339* (2006.01)
*G02F 1/1362* (2006.01)

(52) U.S. Cl.
CPC ...... *G02F 1/134363* (2013.01); *G02F 1/13394* (2013.01); *G02F 1/136227* (2013.01); *G02F 2001/13398* (2013.01)

(58) Field of Classification Search
CPC . H01L 29/04; H01L 29/786; G02F 1/133707; G02F 1/134363; G02F 1/13394; G02F 1/134336; G02F 1/136227
See application file for complete search history.

(56) References Cited

U.S. PATENT DOCUMENTS

| 2009/0153781 | A1* | 6/2009 | Otani et al. ..................... 349/74 |
| 2010/0231818 | A1* | 9/2010 | Min et al. ........................ 349/42 |
| 2011/0080357 | A1* | 4/2011 | Park et al. ...................... 345/173 |
| 2011/0210324 | A1* | 9/2011 | Sakakura et al. ............... 257/43 |

FOREIGN PATENT DOCUMENTS

| KR | 10-2006-0061880 A | 6/2006 |
| KR | 10-2008-0060729 A | 7/2008 |
| KR | 10-2010-0103031 A | 9/2010 |

* cited by examiner

*Primary Examiner* — Whitney T Moore
*Assistant Examiner* — Joseph Galvin, III
(74) *Attorney, Agent, or Firm* — Lee & Morse, P.C.

(57) ABSTRACT

A display device includes a first substrate and a second substrate facing each other, a thin film transistor on the first substrate, a color filter and a black matrix on the first substrate, a column spacer on the first substrate and electrically connected to the thin film transistor, a pixel electrode on one surface of the second substrate, a common electrode on the pixel electrode on the one surface of the second substrate, and a transparent electrode on the other surface of the second substrate. The column spacer is electrically connected to the pixel electrode.

18 Claims, 7 Drawing Sheets

DISPLAY DEVICE

CROSS-REFERENCE TO RELATED APPLICATION

This application claims priority under 35 U.S.C. §119 from Korean Patent Application No. 10-2012-0084863 filed on Aug. 2, 2012 in the Korean Intellectual Property Office, the disclosure of which is incorporated herein by reference in its entirety.

BACKGROUND

1. Field

Embodiments relate to a display device, and more particularly, to a display device that can implement a maximized aperture ratio.

2. Description of the Related Art

Display devices, in particular, liquid crystal display devices, have wide applications in medium-sized or large-sized products, such as monitors and TV sets, as well as small-sized products such as cellular phones, personal digital assistants ("PDAs"), and portable multimedia players ("PMPs") owing to their notable advantages in that they are smaller and lighter, and in addition to having low power consumption.

SUMMARY

Embodiments are directed to a display device, including a first substrate and a second substrate facing each other, a thin film transistor on the first substrate, a color filter and a black matrix on the first substrate, a column spacer on the first substrate and electrically connected to the thin film transistor, a pixel electrode on one surface of the second substrate, a common electrode on the pixel electrode on the one surface of the second substrate, and a transparent electrode on the other surface of the second substrate. The column spacer is electrically connected to the pixel electrode.

The thin film transistor may include a gate electrode, a source electrode, a drain electrode, and a semiconductor layer. The column spacer may be electrically connected to the drain electrode.

The display device may further include a passivation film on the pixel electrode on the one surface of the second substrate. The common electrode may be on the passivation film.

The passivation film may include a cutout that opens a portion of the pixel electrode. The column spacer may be electrically connected to the pixel electrode through the cutout.

The black matrix may be on a first region of the first substrate. The color filter may be on a second region of the first substrate. The first region and the second region may be defined by the column spacer.

The first region may be a region of the first substrate on which the thin film transistor is located.

The transparent electrode may be grounded.

The column spacer may be made of a conductive material.

Embodiments are also directed to a display device including a first substrate and a second substrate facing each other, a thin film transistor on the first substrate, a color filter and a black matrix on the first substrate, a column spacer on the first substrate and electrically connected to the thin film transistor, a common electrode on one surface of the second substrate, and a pixel electrode on the common electrode on the one surface of the second substrate. The column spacer is electrically connected to the pixel electrode.

The thin film transistor may include a gate electrode, a source electrode, a drain electrode, and a semiconductor layer. The column spacer may be electrically connected to the drain electrode.

The display device may further include a passivation film on the common electrode on the one surface of the second substrate. The pixel electrode may be on the passivation film.

The black matrix may be on a first region of the first substrate. The color filter may be on a second region of the first substrate. The first region and the second region may be defined by the column spacer.

The first region may be a region of the first substrate on which the thin film transistor is located.

The display device may further include a transparent electrode on another surface of the second substrate.

The transparent electrode may be grounded.

The column spacer may be made of a conductive material.

BRIEF DESCRIPTION OF THE DRAWINGS

Features will become more apparent by describing in detail preferred embodiments thereof with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

It will be understood that when an element or layer is referred to as being "on" another element or layer, it can be directly on the other element or layer or intervening elements or layers may be present. Like numbers refer to like elements throughout.

It will be understood that, although the teens first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings.

Hereinafter, embodiments will be described in further detail with reference to the accompanying drawings.

Figure 1:
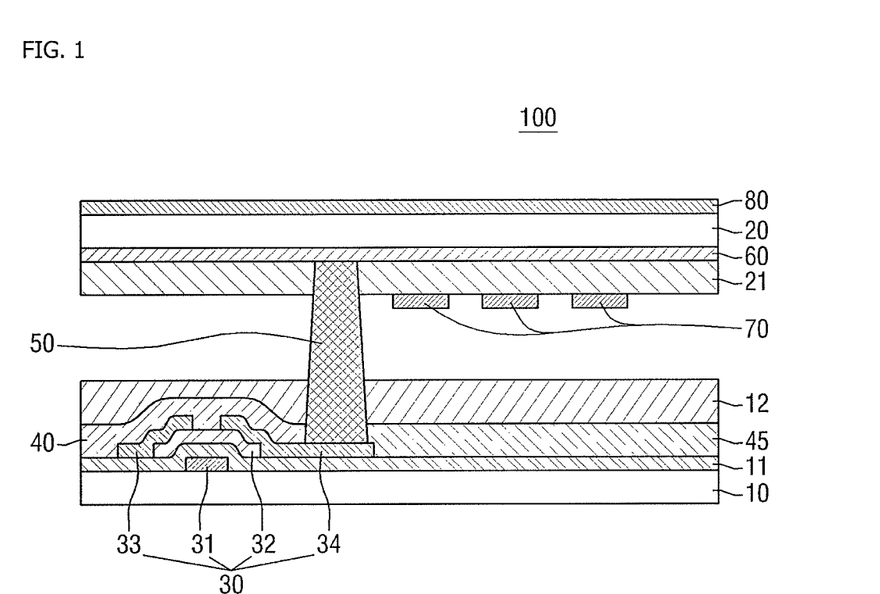
FIGS. 1 to 3 are cross-sectional views of a display device according to an embodiment.
Figure 2:
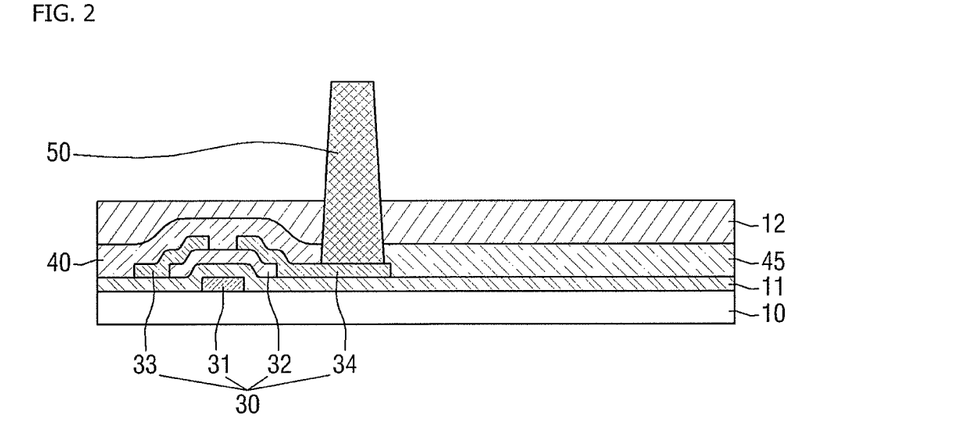
Figure 3:
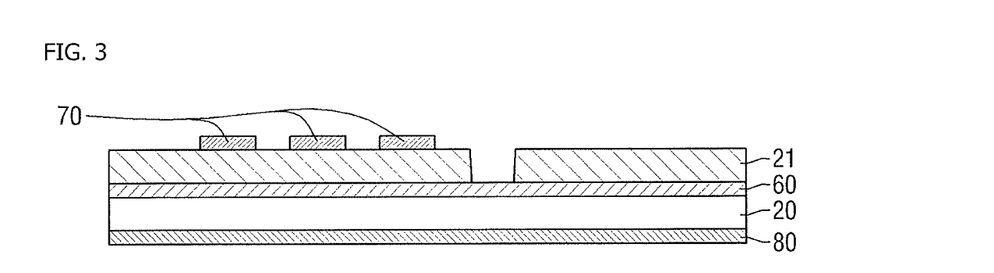

FIGS. 1 to 3 are cross-sectional views of a display device according to an embodiment. Referring to FIGS. 1 to 3, the display device 100 includes a first substrate 10, a second substrate 20, a thin film transistor 30, a color filter 45, a black matrix 40, a column spacer 50, a pixel electrode 60, a common electrode 70 and a transparent electrode 80.

The first substrate 10 and the second substrate 20 are positioned on and under the display device 100 and may be made of an insulating material, such as glass or a plastic material. The first substrate 10 and the second substrate 20 are disposed to face each other and a liquid crystal layer is interposed between the first substrate 10 and the second substrate 20.

The thin film transistor 30, the color filter 45, the black matrix 40 and the column spacer 50 are formed on the first substrate 10, and the pixel electrode 60, the common electrode 70 and the transparent electrode 80 are formed on the second substrate 20. Various elements formed on the first substrate 10 and the second substrate 20 will be described in more detail with reference to FIGS. 2 and 3.

Referring to FIG. 2, a gate electrode 31 may be formed on the first substrate 10, and a gate insulation film 11 may be formed on the entire surface of the first substrate 10 including the gate electrode 31. The gate electrode 31 may be made of a conductive material and the gate insulation film 11 may be formed of a silicon oxide film, a silicon nitride film or a dual layer of these films.

A semiconductor layer 32 may be formed on the gate insulation film 11. At least a portion of the semiconductor layer 32 may overlap the gate electrode 31. The semiconductor layer 32 may overlap the entire area of the gate electrode 31. In some embodiments, the semiconductor layer 32 may be made of amorphous silicon or polysilicon.

A source electrode 33 and a drain electrode 34 may be formed on the gate insulation film 11 including the semiconductor layer 32. The source electrode 33 and the drain electrode 34 may be connected to the semiconductor layer 32. In some implementations, an interlayer dielectric film may be formed on the gate insulation film 11 including the semiconductor layer 32. In other implementations, the source electrode 33 and the drain electrode 34 may be connected to the semiconductor layer 32 through a contact hole.

The thin film transistor 30 is formed on the first substrate 10, and the semiconductor layer 32 formed in the above-described manner may include the gate electrode 31, the source electrode 33 and the drain electrode 34. The thin film transistor 30 may be modified in various manners to have other suitable configurations.

The black matrix 40 is formed on the first substrate 10. The black matrix 40 may be formed on a first region of the first substrate 10. Here, the first region of the first substrate 10 is a non-display region, where the thin film transistor 30 is formed on the first substrate 10, or a region where an image is not displayed. Therefore, although not shown in FIGS. 1 to 3, the black matrix 40 may be formed not only on the region where the thin film transistor 30 is formed but only on the region where various wires are arranged but an image is not displayed.

The color filter 45 is formed on the first substrate 10. The color filter 45 may be formed on a second region of the first substrate 10. Here, the second region of the first substrate 10 is a display region, where the thin film transistor 30 is not formed on the first substrate 10, or a region where an image is displayed. Therefore, although not shown in FIGS. 1 to 3, the color filter 45 may be formed on the region where the thin film transistor 30 is not formed and various wires are not arranged. The color filter 45 may include a red color filter 45, a green color filter 45 and a blue color filter 45.

An overcoating layer 12 may be formed on the first substrate 10. The overcoating layer 12 may be formed on the entire surface of the first substrate 10 including the black matrix 40 and the color filter 45. The overcoating layer 12 may be formed to remove a step difference, which may be generated in the course of forming the thin film transistor 30, the black matrix 40 and the color filter 45 on the first substrate 10 and planarizing a top surface of the first substrate 10.

A cutout that exposes a portion of the thin film transistor 30 may be formed in the overcoating layer 12, the black matrix 40 and the color filter 45. The column spacer 50 may be electrically connected to the thin film transistor 30 on the first substrate 10 through the cutout. The black matrix 40 and the color filter 45 are formed on the first substrate 10, the overcoating layer 12 is formed on the black matrix 40 and the color filter 45, and portions of the overcoating layer 12, the black matrix 40 and the color filter 45 are then removed, thereby forming the cutout that exposes a portion of the drain electrode 34 of the thin film transistor 30. Once the cutout is formed, the column spacer 50 may be formed in the cutout to then be electrically connected to the drain electrode 34. The column spacer 50 may be made of a conductive material.

The first and second regions of the first substrate 10 may be defined by the column spacer 50. Referring to FIGS. 1 and 2, the first region of the first substrate 10 may be a region where the thin film transistor 30 is formed, and may correspond to the left side of the column spacer 50. The second region of the first substrate 10 may be a region where the thin film transistor 30 is not formed, and may correspond to the right side of the column spacer 50.

Referring to FIG. 3, the pixel electrode 60 is formed on one surface of the second substrate 20. The pixel electrode 60 may be a transparent conductive material, for example, indium tin oxide (ITO) or indium zinc oxide (IZO).

On the one surface of the second substrate 20, the common electrode 70 is formed on the pixel electrode 60. The common electrode 70 may be made of the same material as the pixel electrode 60, i.e., a transparent conductive material, for example, indium tin oxide (ITO) or indium zinc oxide (IZO).

A passivation film 21 for electrically separating the common electrode 70 and the pixel electrode 60 may be formed between the common electrode 70 and the pixel electrode 60, and the common electrode 70 may be formed on the passivation film 21. The passivation film 21 may include the cutout that exposes a portion of the pixel electrode 60.

The transparent electrode 80 is formed on the other surface of the second substrate 20. The transparent electrode 80 may be made of the same material as the pixel electrode 60 and the common electrode 70, i.e., a transparent conductive material, for example, indium tin oxide (ITO) or indium zinc oxide (IZO). The transparent electrode 80 can prevent static electricity, which may be generated by contacts with various objects in the display device 100 employing a horizontal electric field, and may be grounded to prevent defects due to DC voltage accumulation in liquid crystals. The term "other surface of the second substrate 20" refers to a surface opposite to the one surface of the second substrate 20.

Referring again to FIG. 1, the first substrate 10 and the second substrate 20 are assembled to each other. In the course of assembling the first substrate 10 and the second substrate 20, the column spacer 50 formed on the first substrate 10 and the pixel electrode 60 formed on one surface of the second substrate 20 are electrically connected to each other. The cutout formed in the passivation film 21 of the second substrate 20 exposes a portion of the pixel electrode 60, and the column spacer 50 formed on the first substrate 10 may be electrically connected to the pixel electrode 60 through the cutout of the passivation film 21.

In the display device 100 according to an embodiment, the black matrix 40 and the color filter 45 are formed on the first substrate 10 on which the thin film transistor 30 is formed, the pixel electrode 60 and the common electrode 70 are formed on the second substrate 20 on which the thin film transistor 30 is not formed. The thin film transistor 30 formed on the first substrate 10 and the pixel electrode 60 formed on the second substrate 20 are electrically connected to each other by the column spacer 50, thereby controlling driving of pixels. With this configuration, loss of aperture ratio, which may be generated in the course of assembling the first substrate 10 and the second substrate 20, may be reduced and uniformity may be improved, thereby implementing a high aperture ratio.

Figure 4:
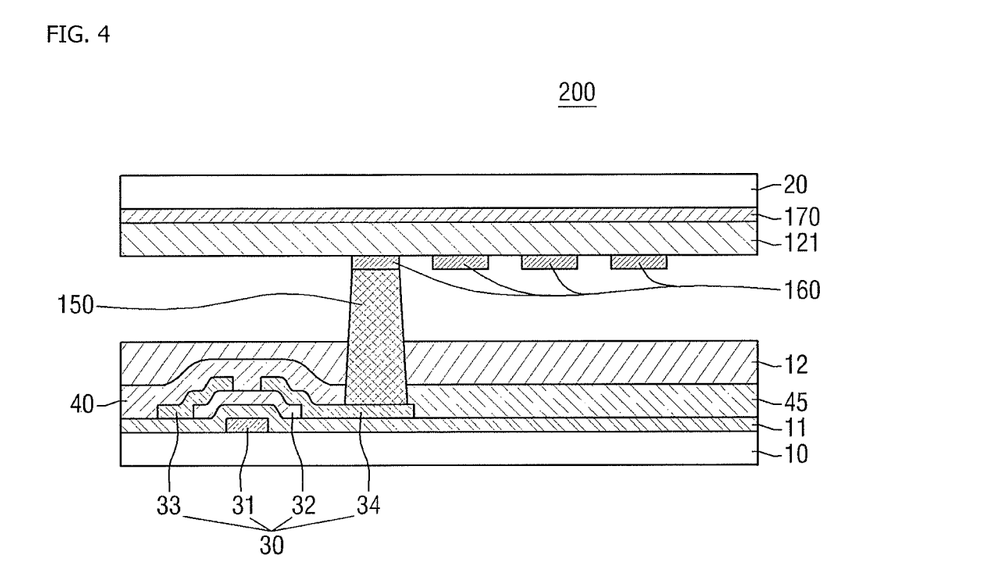
FIGS. 4 to 6 are cross-sectional views of a display device according to another embodiment.
Figure 5:
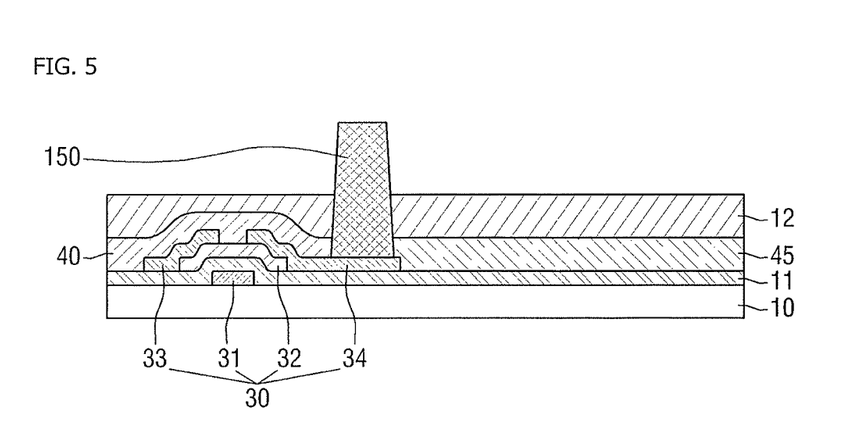
Figure 6:
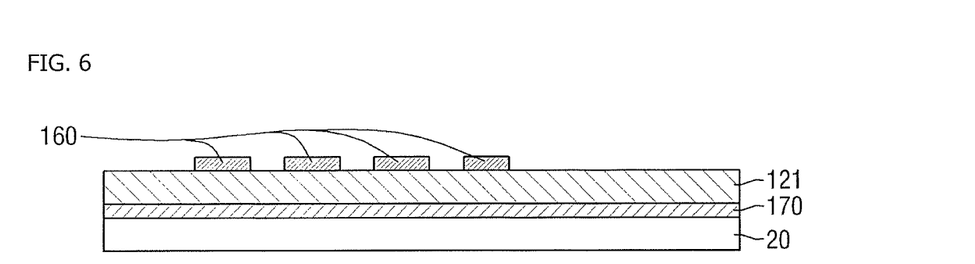

FIGS. 4 to 6 are cross-sectional views of a display device according to another embodiment. Referring to FIGS. 4 to 6, the display device 200 may include a first substrate 10, a second substrate 20, a thin film transistor 30, a color filter 45, a black matrix 40, a column spacer 150, a pixel electrode 160 and a common electrode 170. For the sake of convenient explanation, substantially the same elements as those of the display device shown in FIGS. 1 to 3 are denoted by the same reference numerals and explanations thereof will not be repeated.

Referring to FIG. 6, the common electrode 170 is formed on one surface of the second substrate 20. The common electrode 170 may be made of a transparent conductive material, for example, indium tin oxide (ITO) or indium zinc oxide (IZO).

On the one surface of the second substrate 20, the pixel electrode 160 is formed on the common electrode 170. The pixel electrode 160 may be made of the same material as the common electrode 170, i.e., a transparent conductive material, for example, indium tin oxide (ITO) or indium zinc oxide (IZO).

A passivation film 121 for electrically separating the common electrode 170 and the pixel electrode 160 may be formed between the common electrode 170 and the pixel electrode 160, and the pixel electrode 160 may be formed on the passivation film 121.

Referring to FIG. 5, a cutout that exposes a portion of the thin film transistor 30 may be formed on the overcoating layer 12, the black matrix 40 and the color filter 45. The column spacer 150 may be electrically connected to the thin film transistor 30 on the first substrate 10 through the cutout. The black matrix 40 and the color filter 45 are formed on the first substrate 10, the overcoating layer 12 is formed on the black matrix 40 and the color filter 45, and portions of the overcoating layer 12 and the color filter 45 are then removed, thereby forming the cutout that exposes a portion of the drain electrode 34 of the thin film transistor 30. Once the cutout is formed, the column spacer 150 may be formed in the cutout to then be electrically connected to the drain electrode 34. The column spacer 150 may be made of a conductive material.

Referring again to FIG. 4, the first substrate 10 and the second substrate 20 are assembled to each other. In the course of assembling the first substrate 10 and the second substrate 20, the column spacer 150 formed on the first substrate 10 and the pixel electrode 160 formed on one surface of the second substrate 20 are electrically connected to each other. The display device 200 shown in FIGS. 4 to 6 is different from the display device 100 shown in FIGS. 1 to 3 in that the display device 200 has the common electrode 170 formed on the second substrate 20 and the pixel electrode 160 formed on the common electrode 170 and the column spacer 150 has a reduced height assuming that the same cell cap is maintained. In addition, in the display device 200 shown in FIGS. 4 to 6, the common electrode 170 may be directly formed on one surface of the second substrate 20. Accordingly, providing the transparent electrode on the other surface of the second substrate 20 may be omitted.

In the display device 200 shown in FIGS. 4 to 6, the black matrix 40 and the color filter 45 are formed on the first substrate 10 on which the thin film transistor 30 is formed, the pixel electrode 160 and the common electrode 170 are formed on the second substrate 20 on which the thin film transistor 30 is not formed, the thin film transistor 30 formed on the first substrate 10 and the pixel electrode 160 formed on the second substrate 20 are electrically connected to each other by the column spacer 150, thereby controlling driving of pixels. With this configuration, loss of aperture ratio, which may be generated in the course of assembling the first substrate 10 and the second substrate 20, may be reduced and uniformity may be improved, thereby implementing a high aperture ratio.

In addition, in the display device 200 employing a horizontal electric field, the transparent electrode provided on the other surface of the second substrate 20 for the purpose of preventing static electricity and defects may be omitted. Accordingly, the manufacturing process of the display device may be simplified by removing the providing of the transparent electrode 280, while implementing a high aperture ratio and high brightness.

Figure 7:
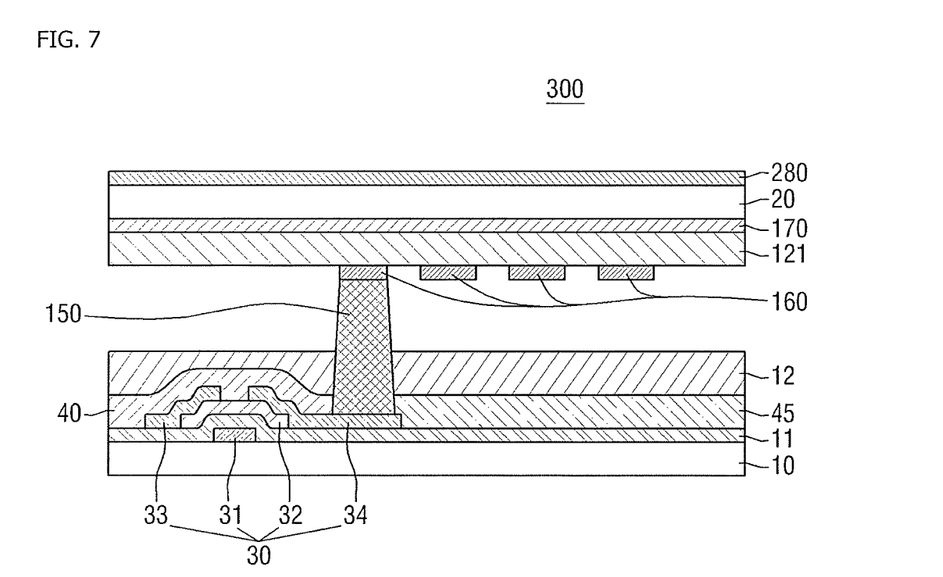
FIG. 7 is a cross-sectional view of a display device according to still another embodiment.

FIG. 7 is a cross-sectional view of a display device according to still another embodiment.

Referring to FIG. 7, the display device 300 may include a first substrate 10, a second substrate 20, a thin film transistor 30, a color filter 45, a black matrix 40, a column spacer 150, a pixel electrode 160, a common electrode 170 and a transparent electrode 280. For the sake of convenient explanation, substantially the same elements as those of the display device shown in FIGS. 4 to 6 are denoted by the same reference numerals and explanations thereof will not be repeated.

The transparent electrode 280 is formed on the other surface of the second substrate 20. Transparent electrode 280 may be made of the same material as the pixel electrode 160 and the common electrode 170, i.e., a transparent conductive material, for example, indium tin oxide (ITO) or indium zinc oxide (IZO). The transparent electrode 280 can prevent static electricity, which may be generated by contacts with various objects in the display device 300 employing a horizontal electric field, and may be grounded to prevent defects due to DC voltage accumulation in liquid crystals. The term "other surface of the second substrate 20" refers to a surface opposite to the one surface of the second substrate 20.

By way of summation and review, a liquid crystal display device includes a thin film transistor substrate, a color filter substrate, and a liquid crystal layer. The color filter substrate includes a common electrode to which a common voltage is applied. A pixel voltage different from the common voltage is applied to the substrate. A fringe field is formed by a difference between the common voltage and the pixel voltage, and liquid crystal molecules contained in the liquid crystal layer rotate by the fringe field. Therefore, a rotation rate of liquid crystal molecules may vary according to the magnitude of the fringe field. The larger the fringe field is, the greater the rotation rate is, thereby improving the transmittance and response speed.

However, a liquid crystal display device may have relatively poor lateral visibility compared with front visibility. In this regard, various attempts to overcome poor lateral visibility have been made, including liquid crystal alignment and driving methods. To achieve a wide viewing angle, a patterned vertically aligned (PVA) mode in which a PVA-mode liquid crystal display has cutouts as domain-defining members, an in-plane switching (IPS) mode in which a horizontal electric field is used, etc. have been proposed.

However, the PVA mode LCD may exhibit textures or afterimages. In the IPS mode LCD, the aperture ratio may be deteriorated by a common electrode, resulting in a reduction in the brightness. Accordingly, the demand for a backlight unit implementing high brightness has increased. To achieve a wide viewing angle and high brightness, a plane to line switching (PLS) mode LCD adopting the IPS mode has drawn attention.

Embodiments disclosed herein may provide a display device that may have a high aperture ratio while also providing a wide viewing angle mode. In addition, the embodiments may provide a display device that can provide a high aperture ratio and high brightness.

While embodiments have been particularly shown and described with reference to exemplary embodiments thereof, it will be understood by those of ordinary skill in the art that various changes in form and details may be made therein without departing from the spirit and scope as defined by the following claims. It is therefore desired that the present embodiments be considered in all respects as illustrative and not restrictive, reference being made to the appended claims rather than the foregoing description to indicate the scope thereof.

What is claimed is:

1. A display device, comprising:
a first substrate and a second substrate facing each other;
a liquid crystal layer interposed between the first substrate and the second substrate;
a thin film transistor on the first substrate;
a color filter and a black matrix on the first substrate;
a pixel electrode on one surface of the second substrate;
a column spacer on the first substrate and electrically connected to the thin film transistor; the column spacer being electrically connected to the pixel electrode;
a common electrode on the pixel electrode on the one surface of the second substrate; and
a transparent electrode on another surface of the second substrate, wherein:
the pixel electrode and the common electrode are between the second substrate and the liquid crystal layer, and
the pixel electrode is between the common electrode and the second substrate.

2. The display device of claim 1, wherein:
the thin film transistor includes a gate electrode, a source electrode, a drain electrode, and a semiconductor layer, and
the column spacer is electrically connected to the drain electrode.

3. The display device of claim 1, further comprising a passivation film on the pixel electrode on the one surface of the second substrate, the common electrode being on the passivation film.

4. The display device of claim 3, wherein:
the passivation film and the liquid crystal layer includes a cutout that exposes a portion of the pixel electrode, and
the column spacer is electrically connected to the pixel electrode through the cutout.

5. The display device of claim 1, wherein:
the black matrix is only on a first region of the first substrate,
the color filter is only on a second region of the first substrate, and
the first region and the second region are defined by the column spacer.

6. The display device of claim 5, wherein the first region is a region of the first substrate on which the thin film transistor is located.

7. The display device of claim 1, wherein the transparent electrode is grounded.

8. The display device of claim 1, wherein the column spacer is made of a conductive material.

9. A display device, comprising:
a first substrate and a second substrate facing each other;
a thin film transistor on the first substrate;
a color filter and a black matrix on the first substrate;
an overcoating layer on the color filter and the black matrix on the first substrate;
a column spacer on the first substrate, the column spacer being electrically connected to the thin film transistor;
a common electrode on one surface of the second substrate; and
a pixel electrode on the common electrode on the one surface of the second substrate,
wherein the column spacer is electrically connected to the pixel electrode, wherein:
the black matrix is only on a first region of the first substrate,
the color filter is only on a second region of the first substrate, and
the first region and the second region are defined by the column spacer.

10. The display device of claim 9, wherein:
the thin film transistor includes a gate electrode, a source electrode, a drain electrode, and a semiconductor layer, and
the column spacer is electrically connected to the drain electrode.

11. The display device of claim 9, further comprising a passivation film on the common electrode on the one surface of the second substrate, the pixel electrode being on the passivation film.

12. The display device of claim 9, wherein the first region is a region of the first substrate on which the thin film transistor is located.

13. The display device of claim 9, further comprising a transparent electrode on another surface of the second substrate.

14. The display device of claim 13, wherein the transparent electrode is grounded.

15. The display device of claim 9, wherein the column spacer is made of a conductive material.

16. The display device of claim 1, further comprising an overcoating layer on the color filter and the black matrix on the first substrate.

17. The display device of claim 16, further comprising a passivation film on the pixel electrode on the one surface of the second substrate, the common electrode being on the passivation film, wherein:
the passivation film, the liquid crystal layer, and the overcoating layer include a cutout that exposes a portion of the pixel electrode, and
the column spacer is electrically connected to the pixel electrode through the cutout.

18. The display device of claim 9, further comprising a liquid crystal layer interposed between the first substrate and the second substrate, wherein
the overcoating layer is between the liquid crystal layer and the first substrate.

* * * * *